(12) United States Patent
Liao (10) Patent No.: US 10,005,109 B2
(45) Date of Patent: Jun. 26, 2018

(54) PNEUMATIC PRESSURE PULSE CLEANING MACHINE

(71) Applicant: LIH YANN INDUSTRIAL CO., LTD., Taichung (TW)

(72) Inventor: Po Lin Liao, Taichung (TW)

(73) Assignee: LIH YANN INDUSTRIAL CO., LTD., Taichung (TW)

( * ) Notice: Subject to any disclaimer, the term of this patent is extended or adjusted under 35 U.S.C. 154(b) by 305 days.

(21) Appl. No.: 14/986,781

(22) Filed: Jan. 4, 2016

(65) Prior Publication Data

US 2017/0189940 A1    Jul. 6, 2017

(51) Int. Cl.
| | |
|---|---|
| *B08B 3/02* | (2006.01) |
| *A23N 12/02* | (2006.01) |
| *A47L 15/42* | (2006.01) |
| *A47J 43/24* | (2006.01) |
| *B08B 1/00* | (2006.01) |

(52) U.S. Cl.
CPC .............. *B08B 3/02* (2013.01); *A23N 12/02* (2013.01); *A47J 43/24* (2013.01); *A47L 15/4214* (2013.01); *A47L 15/4289* (2013.01); *B08B 1/002* (2013.01)

(58) Field of Classification Search
CPC ....................................................... B08B 3/02
See application file for complete search history.

(56) References Cited

U.S. PATENT DOCUMENTS

D539,539 S *   4/2007  Braden ..................... D14/203.7
2010/0307544 A1* 12/2010 Lele ........................ B08B 3/006
                                                            134/105

* cited by examiner

*Primary Examiner* — Jason Y Ko
(74) *Attorney, Agent, or Firm* — Andrew C. Cheng (57) ABSTRACT

A pneumatic pressure pulse cleaning machine includes a container body, which has a rear side to which a container cover is rotatably mounted and also has an interior space in which a pipe assembly that includes pipes connected together to form a grating configuration is received. The pipe assembly has a plurality of through holes formed therein and facing upwards. A support board is received in the interior space and arranged above the pipe assembly so that an article disposition zone is provided in the container body above the support board. The pipe assembly includes a joint, which is connectable with a tube for connection with a pneumatic pressure source. Articles to be washed are positioned on the support board. The pneumatic pressure source is activated to generate pneumatic pressure pulses that are ejected through the through holes to impinge and thus clean the articles.

17 Claims, 8 Drawing Sheets

PNEUMATIC PRESSURE PULSE CLEANING MACHINE

BACKGROUND OF THE INVENTION

1. Field of the Invention

The present invention relates to the field of cleaning machine, and more particularly to a pneumatic pressure pulse cleaning machine, which applies pneumatically induced pulsation for flushing and washing an article held in a closed space in order to achieve an effect of efficient cleaning.

2. The Related Arts

Heretofore, cleaning an article, such as cleaning an automobile part, is generally conducted on a work table. A sink like space is provided on the work table to receive and hold therein a cleaning liquid. The article to be cleaned is placed in the sink and immersed in the cleaning liquid. An operator uses a cleaning tool, with the cleaning liquid attached thereto, to brush and rub the automobile part in order to clean the part. This process, although effective to clean the automobile part, is quite labor consuming. In addition, each cleaning process can handle only one or a few parts so that a great amount of time would be necessary if a large number of automobile parts need to be cleaned. Apparently, such a conventional way of cleaning automobile parts may need further improvement.

It is thus desired to provide a cleaning machine that provides a high efficiency of cleaning multiple articles at the same time so as to overcome the above-discussed problems of the prior art.

SUMMARY OF THE INVENTION

The primary object of the present invention is to provide a pneumatic pressure pulse cleaning machine that applies pneumatic pulses for washing and cleaning an article received in a closed space in order to achieve efficient cleaning.

To fulfill the aforesaid object, the present invention proposes a pneumatic pressure pulse cleaning machine, which comprises a container body, which has a rear side to which a container cover is rotatably mounted and has an interior space in which a pipe assembly that comprises pipes connected together to form a grating configuration is received. The pipe assembly has a plurality of through holes formed therein and facing upwards. A support board is received in the interior space and arranged above the pipe assembly so that an article disposition zone is provided in the container body above the support board. The pipe assembly comprises a joint, which is connectable with a tube for extending outside to connect with a pneumatic pressure source. As such, articles to be washed are placed inside the container body and positioned on the support board. After a cleaning liquid is filled into the container, the container cover is closed and the pneumatic pressure source is activated to generate pneumatic pressure pulses that are ejected through a plurality of through holes and travel through the support board to impinge the articles to be washed. The pneumatic pressure pulses repeatedly flushes and washes the articles to be washed so as to clean the articles.

BRIEF DESCRIPTION OF THE DRAWINGS

The present invention can be fully understood from the following detailed description and preferred embodiments with reference to the accompanying drawings, in which.

DETAILED DESCRIPTION OF THE PREFERRED EMBODIMENTS

The present invention provides a design of a pneumatic pressure pulse cleaning machine.

To better expound the purposes, features, and effectiveness of the present invention for better understanding and appreciation of the present invention, description will be given below with reference to embodiments and drawings of the present invention.

Figure 1:
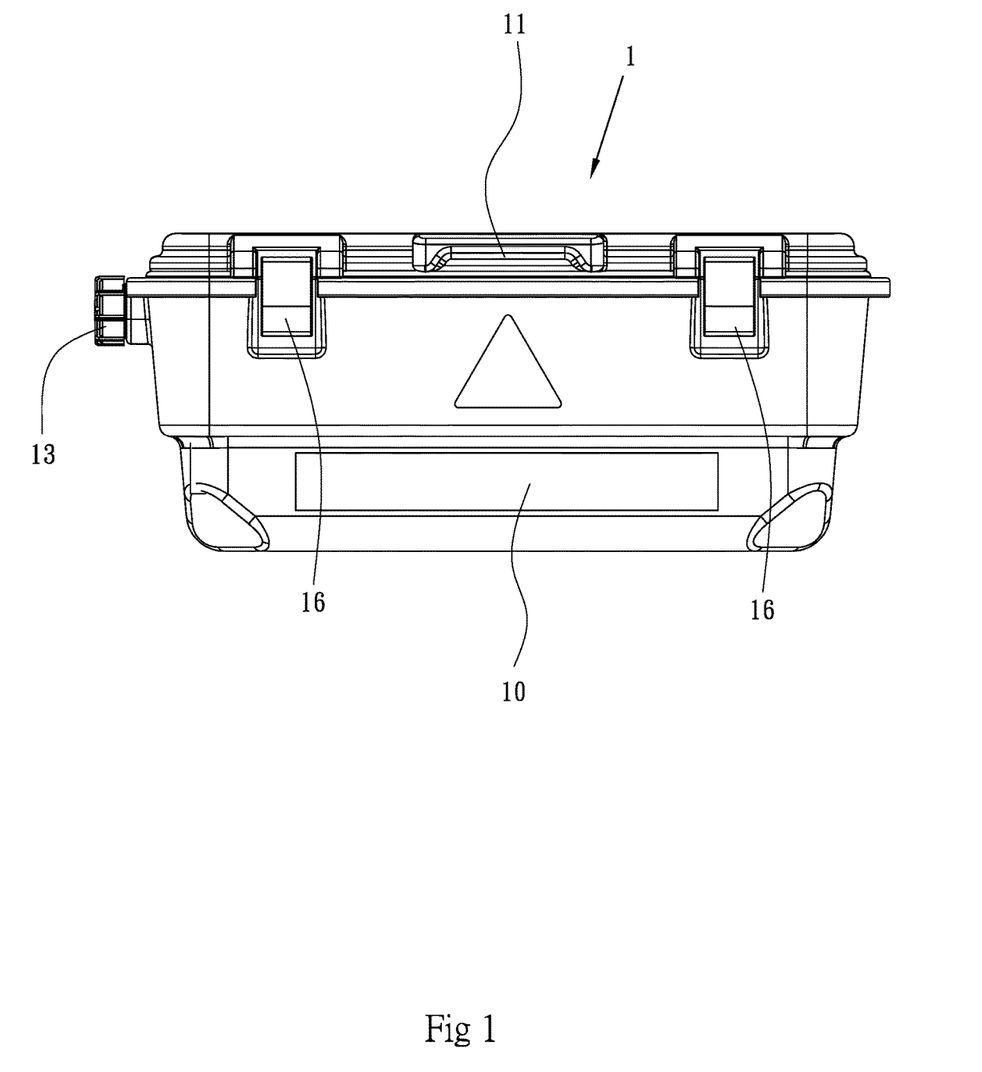
FIG. 1 is a front view showing an embodiment of the present disclosure.
Figure 2:
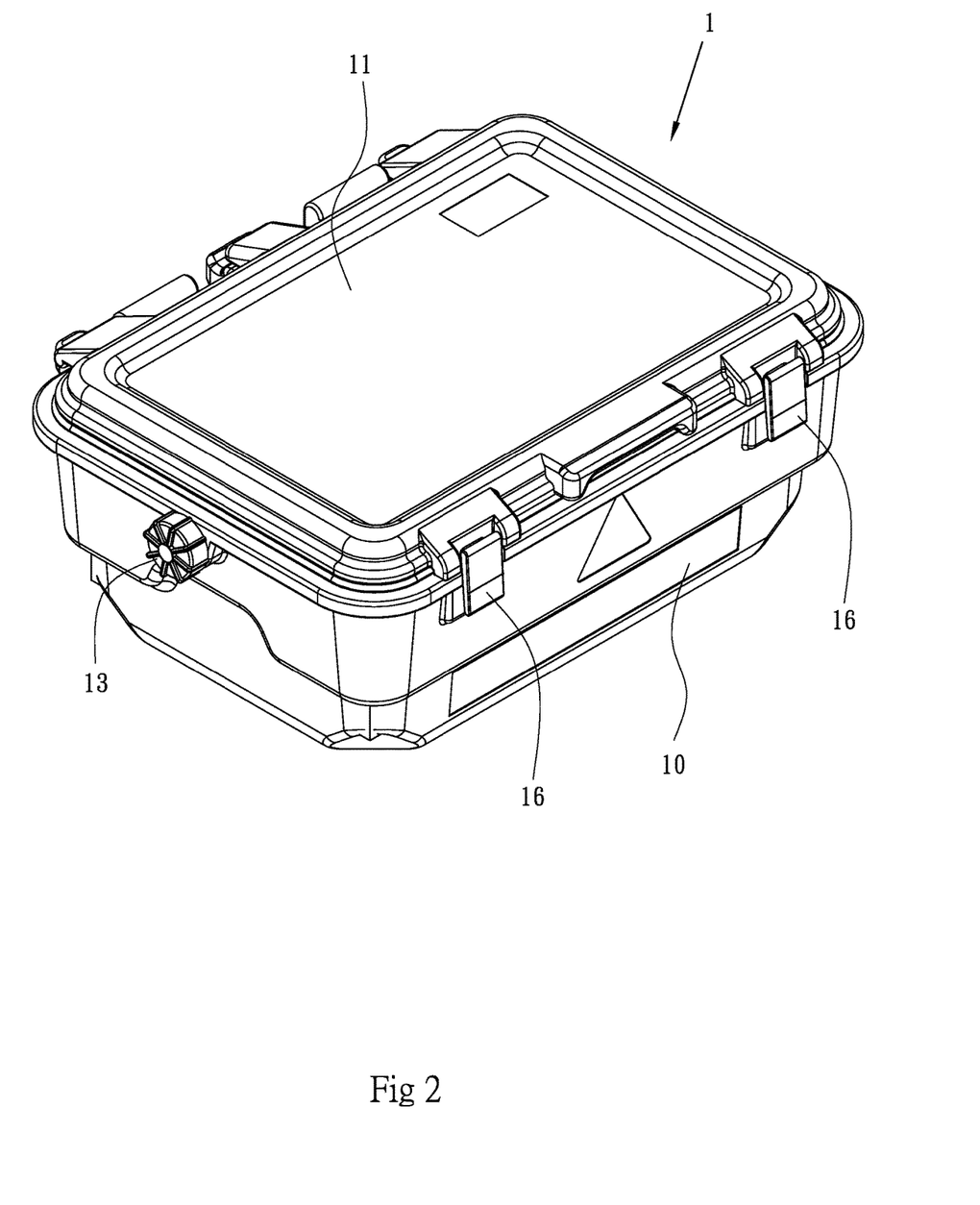
FIG. 2 is a perspective view showing the embodiment of the present disclosure.
Figure 3:
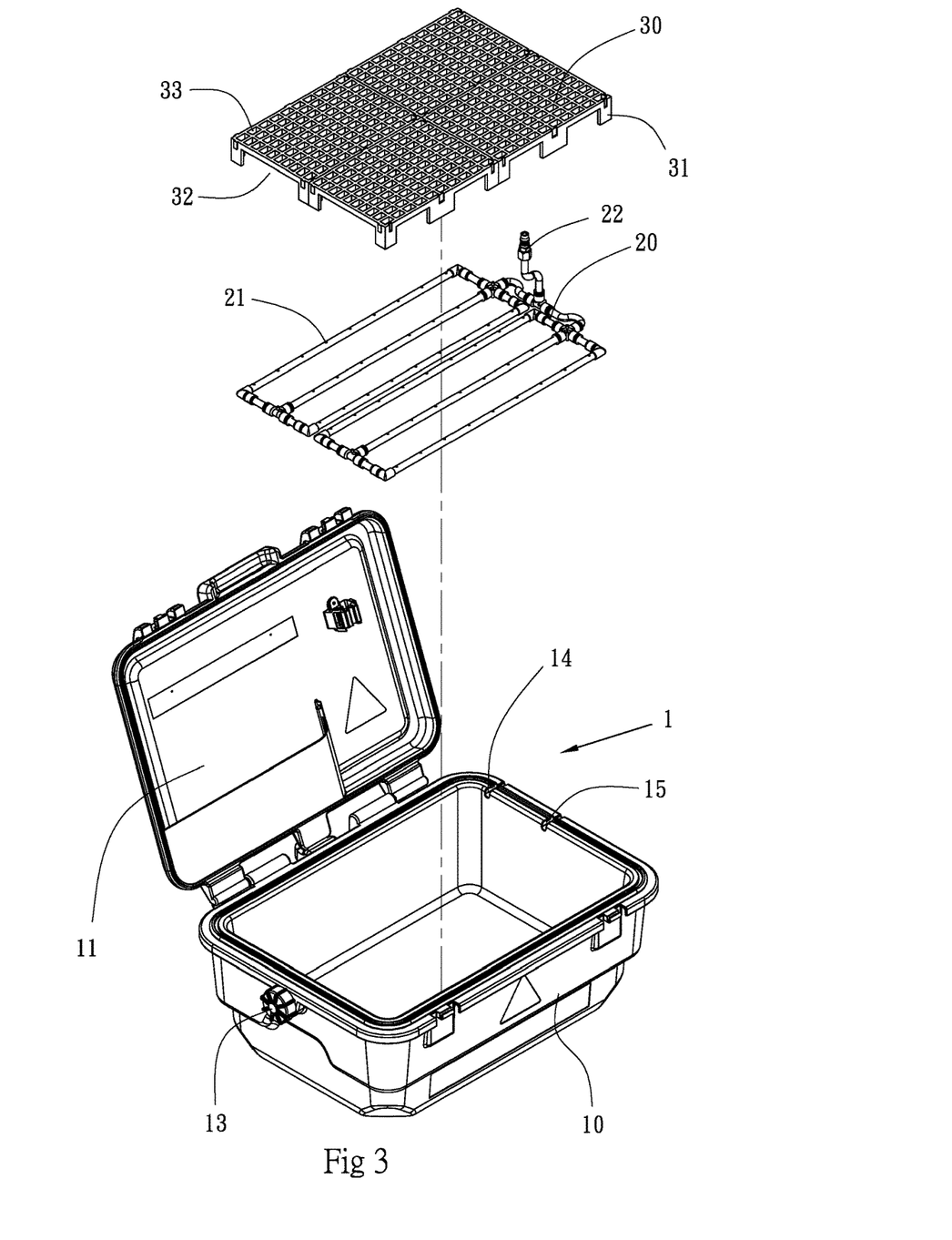
FIG. 3 is an exploded view showing the embodiment of the present disclosure.
Figure 4:
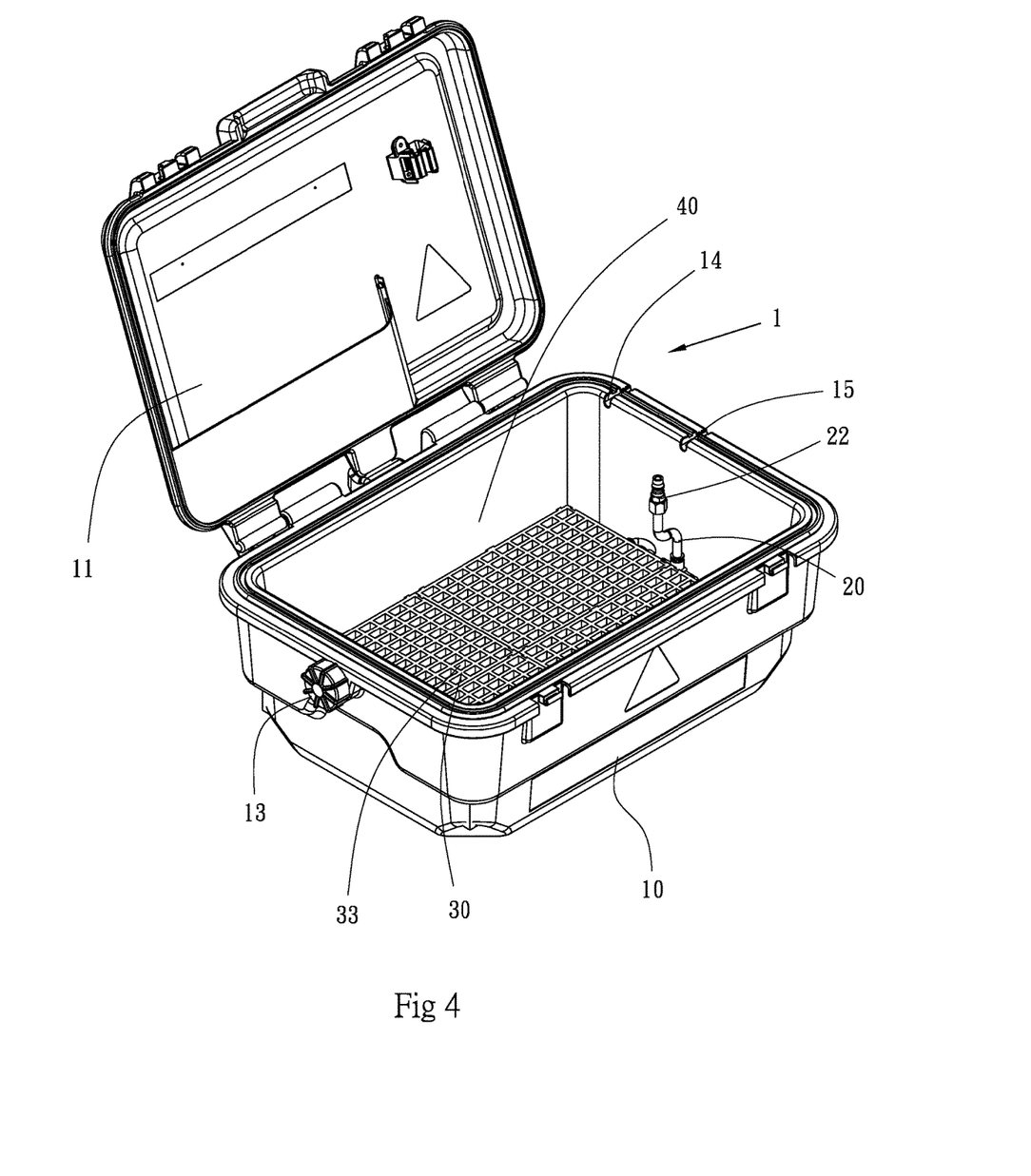
FIG. 4 is a perspective view showing the embodiment of the present invention in an assembled and open condition.
Figure 5:
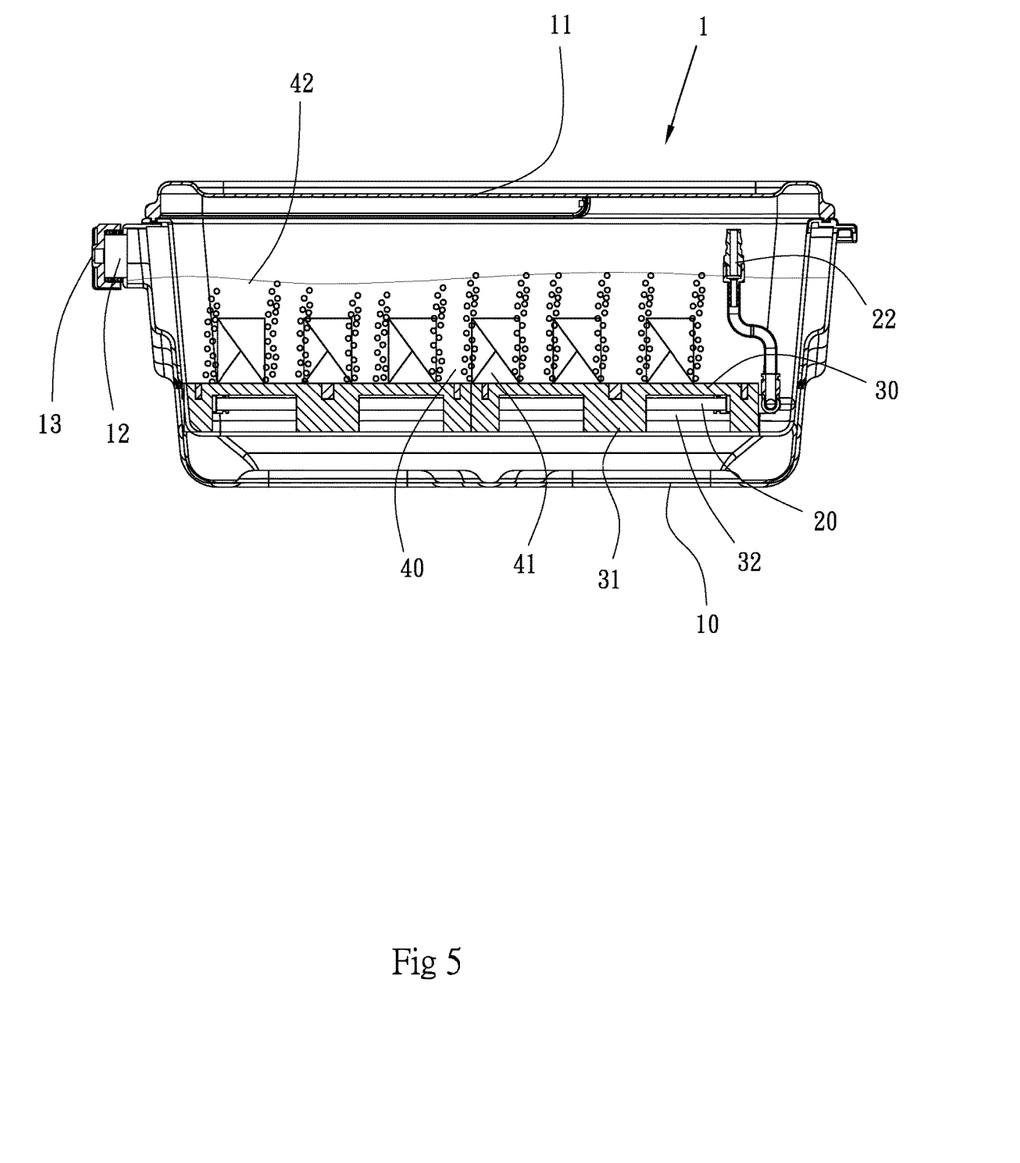
FIG. 5 is a front view, in a sectioned form, showing an operation of the embodiment of the present invention.
Figure 6:
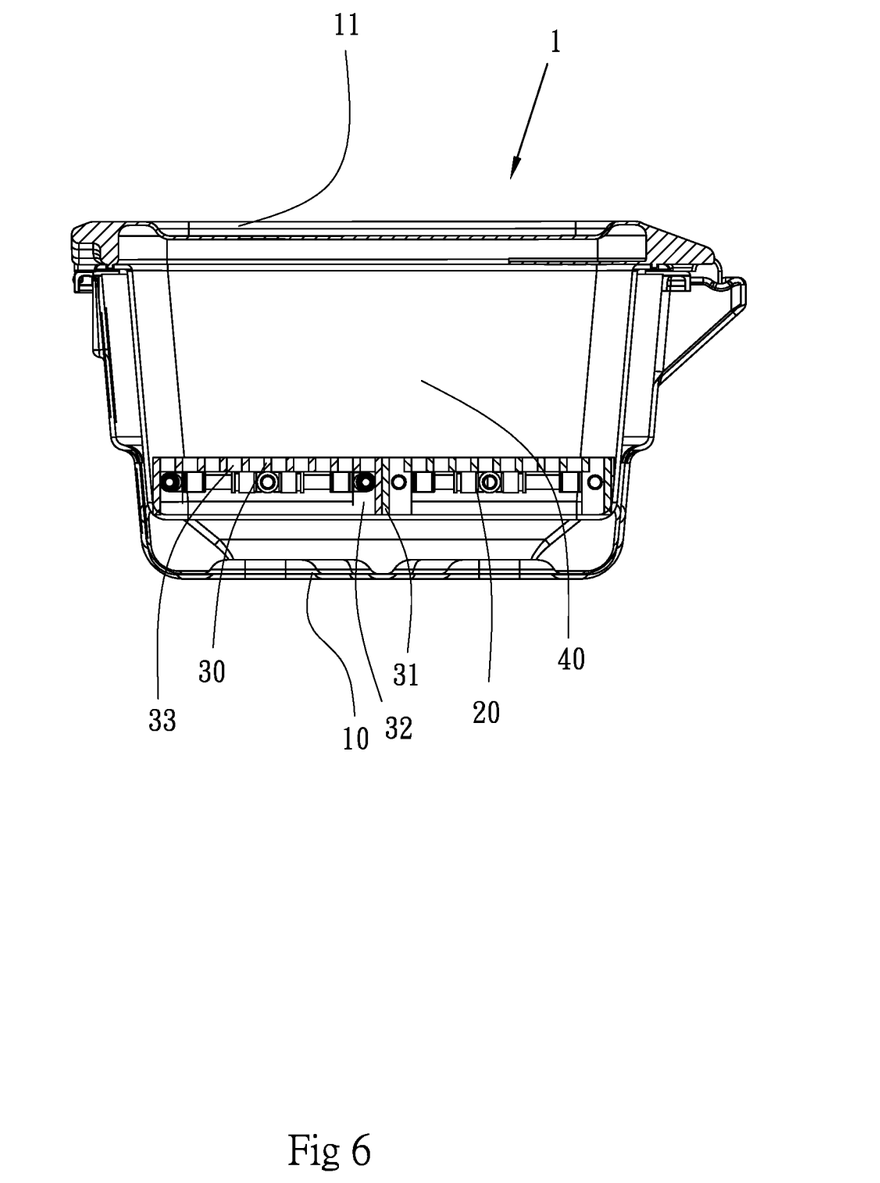
FIG. 6 is a side elevational view, in a sectioned form, showing the embodiment of the present invention.
Figure 7:
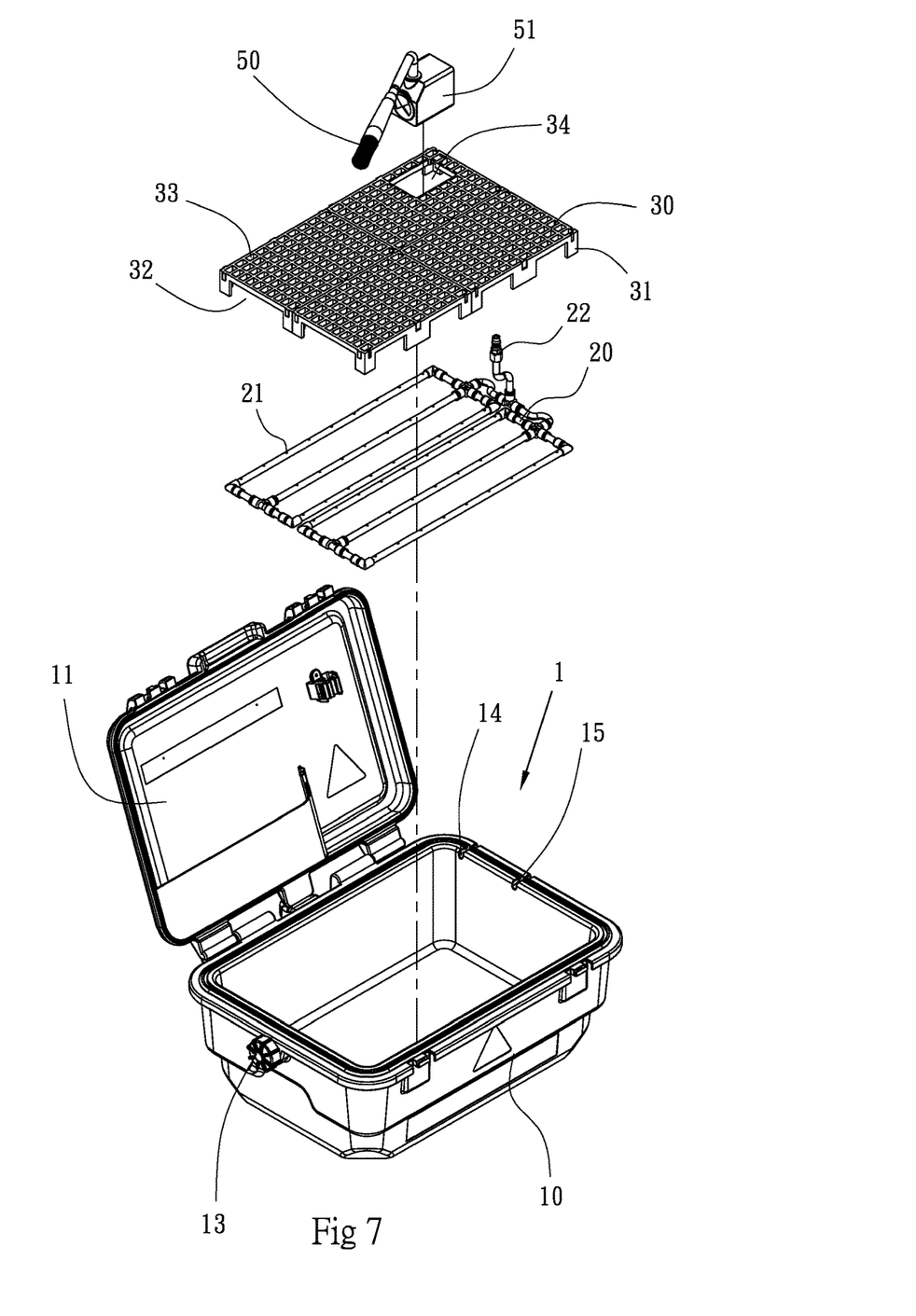
FIG. 7 is an exploded view showing another embodiment of the present invention.
Figure 8:
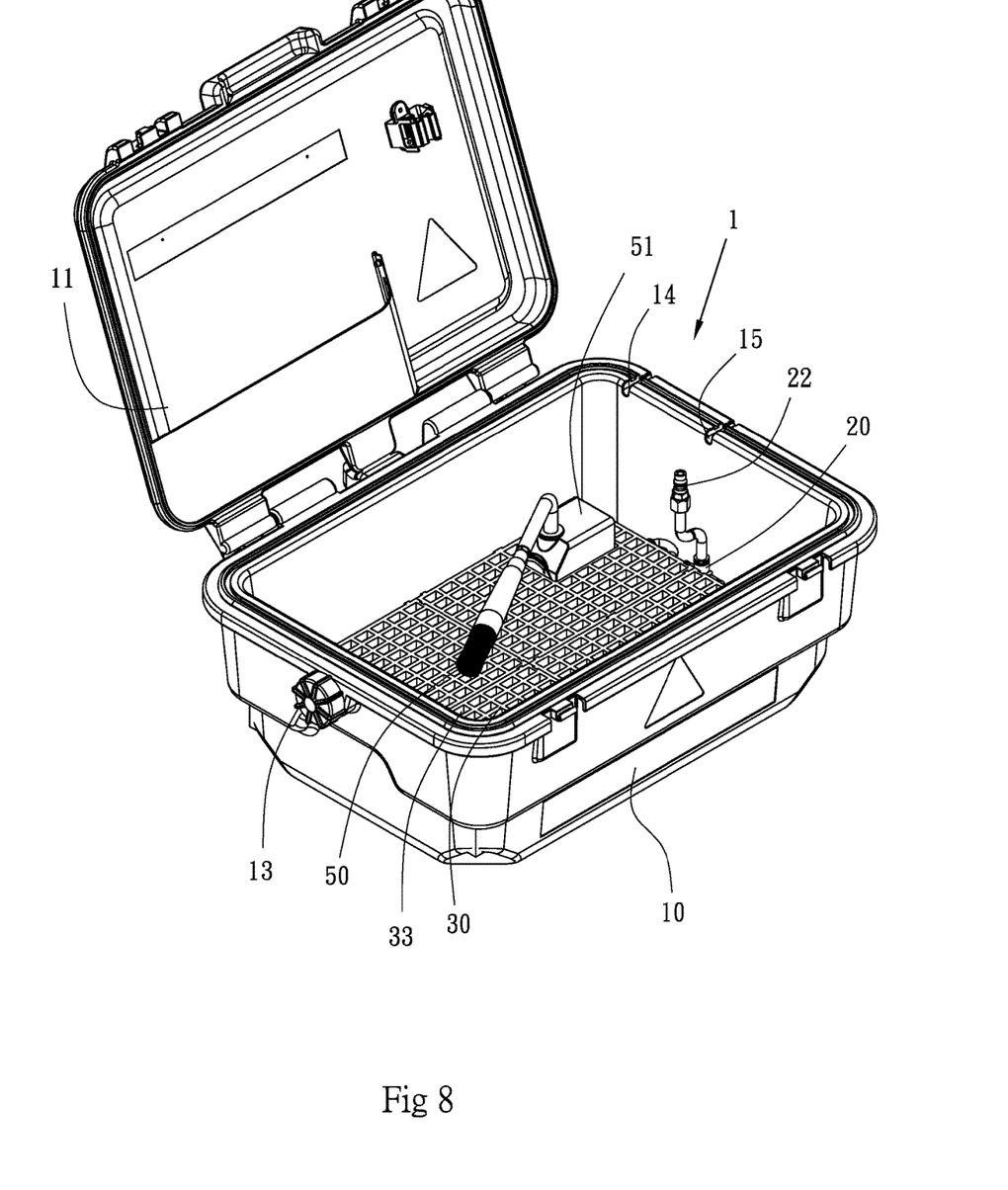
FIG. 8 is a perspective view showing said another embodiment of the present invention in an assembled and open condition.

Referring to FIGS. 1-8, the present invention provides a pneumatic pressure pulse cleaning machine, which comprises:

a container body 10, which has a rear side having an upper portion to which a container cover 11 is rotatably mounted to collectively form a closable container 1;

a pipe assembly 20, which comprises pipes that are connected to and in communication with each other to collectively form a grating configuration, the pipe assembly 20 being received in an interior space of the container body 10 at a location close to a bottom of the container body, the pipe assembly 20 comprising a plurality of through holes 21 formed therein and facing upward, the pipe assembly 20 comprising a joint 22, which is connectable, perhaps via an external pipe or hose, to an external pneumatic pressure source; and a support board or pallet 30, which is received in the interior space of the container body 10 and comprises legs 31 formed on an underside thereof to be positioned on the bottom of the container body for supporting the support board in an elevated manner with a space 32 formed between the underside of the support board and the bottom of the container body, the support board 30 being located above the pipe assembly 20 with the pipe assembly 20 received in the space 32 under the support board 30, the support board 30 comprising a plurality of openings 33 formed in an upper surface thereof and extending completely through the support board, a portion of the interior space of the container body 10 that is above the support board 30 forming an article-to-be-washed disposition zone 40, wherein one or multiple articles-to-be-washed 41 are disposed into the container body 10 to be located in the article-to-be-washed disposition zone 40 and above the support board 30 and a cleaning liquid 42 is filled into the container, the container cover 11 being then closed and a pneumatic pressure source being activated to allow pneumatic pressure pulses to be supplied through the pipe assembly 20 and ejecting out of the plurality of through holes 21, travelling through the openings 33 of the support board 30 to impinge the articlesto-be-washed 41, so that the pneumatic pressure pulses repeatedly flush and wash the articles-to-be-washed 41 to thereby allow a large number of articles 41 to washed and cleaned simultaneously and efficiently (see FIG. 5).

The pneumatic pressure pulse cleaning machine comprises a liquid filling opening 12 that is formed in a side wall of the container body 10. The liquid filling opening 12 is closable by a closure cap 13 and may be opened for filling the cleaning liquid 42 into the container.

The pneumatic pressure pulse cleaning machine also comprises two notches 14, 15 formed in a side wall of the container body 10, preferably being opposite to the liquid filling opening 12. One of the notches, such as the notch 14, receives the external pipe or hose that is connected to the joint 22 to be positioned and retained therein for extension into the container 1, while the other one of the notches, such as the notch 15, functions as a vent hole.

The pneumatic pressure pulse cleaning machine comprises two buckles 16 mounted to a front side of the container body 10. When the container cover 11 is closed, the buckles 16 may engage and thus fix the container cover 11.

The pneumatic pressure pulse cleaning machine comprises a rectangular opening 34 formed in the support board 30 and a rectangular liquid pump 51 that is coupled to a brush 50. The rectangular liquid pump 51 is receivable and mounted in the rectangular opening 34 (see FIGS. 7 and 8). When additional or intense cleaning is required for the articles-to-be-washed 41, the brush 50 may be used for manually brushing and cleaning of the articles.

The pneumatic pressure pulse cleaning machine may be provided for use with an oil that serves as the cleaning liquid 42 to provide a commercial or industrial use for washing and cleaning automobile parts or machine parts.

The pneumatic pressure pulse cleaning machine may be used with plain or clean or fresh water that serves as the cleaning liquid 42 for washing vegetables/fruits, foodstuffs, or other agricultural products.

The pneumatic pressure pulse cleaning machine may be used with dish washing detergent or fresh water that serves as the cleaning liquid 42 for cleaning dishes, bowls, and tableware.

Illustrated above are the embodiments of the present disclosure, which should not be considered limitative to the scope of the invention. Therefore, any equivalent substitutions or variations to the structures or processes disclosed in the specification and the drawing of the present disclosure, or a direct or indirect application of the invention to the other technical fields should be considered as part of the present disclosure.

What is claimed is:

1. A pneumatic pressure pulse cleaning machine, comprising:
    a container body, which has a rear side having an upper portion to which a container cover is rotatably mounted to collectively form a closable container;
    a pipe assembly, which comprises pipes that are connected to and in communication with each other to collectively form a grating configuration, the pipe assembly being received in an interior space of the container body at a location close to a bottom of the container body, the pipe assembly comprising a plurality of through holes formed therein and facing upward, the pipe assembly comprising a joint, which is adapted to connect through a tube to an external pneumatic pressure source to supply pressurized air into the container body; and
    a support board, which is received in the interior space of the container body and comprises legs formed on an underside thereof to be positioned on the bottom of the container body for supporting the support board in an elevated manner with a space formed between the underside of the support board and the bottom of the container body, the support board being located above the pipe assembly with the pipe assembly received in the space under the support board, the support board comprising a plurality of openings formed in an upper surface thereof and extending completely through the support board, a portion of the interior space of the container body that is above the support board forming an article-to-be-washed disposition zone, wherein one or multiple articles-to-be-washed are receivable into the container body to be located in the article-to-be-washed disposition zone and above the support board and a cleaning liquid is filled into the container such that the article-to-be washed is immersed in the cleaning liquid, the container cover being then closed and the pressurized air, which is supplied from the pneumatic pressure source through the pipe assembly and jets out of the plurality of through holes, forms pneumatic pressure pulses in the cleaning liquid, travelling through the openings of the support board and moving through the cleaning liquid to impinge the articles-to-be-washed that is immersed in the cleaning liquid, so that the pneumatic pressure pulses repeatedly flush and wash the articles-to-be-washed immersed in the cleaning liquid to thereby allow a large number of articles to washed and cleaned simultaneously and efficiently;
    wherein the article-to-be-washed is immersed in the cleaning liquid and is cleaned by the cleaning liquid and is further cleansed by being impinged by pressurized gas, which jets from the through holes formed in the pipe assembly connected to the external pneumatic source and moves through the cleaning liquid to impinge the article-to-be-washed.

2. The pneumatic pressure pulse cleaning machine as claimed in claim 1, wherein the container body comprises a liquid filling opening that is formed in a side wall of the container body, the liquid filling opening being closable by a closure cap and being openable for filling the cleaning liquid into the container.

3. The pneumatic pressure pulse cleaning machine as claimed in claim 2, wherein the container body has an opposite side wall in which two notches are formed, one of notches adapted to receive a tube that is connected to the joint for extension out of the container, the other one of the notches functioning to discharge gas to the outside.

4. The pneumatic pressure pulse cleaning machine as claimed in claim 3, wherein the container body has a front side to which two buckles are mounted, so that when the container cover is closed, the two buckles are engageable with and thus fix the container cover.

5. The pneumatic pressure pulse cleaning machine as claimed in claim 1, wherein the support board comprises a rectangular opening formed therein, a brush being coupled to a rectangular liquid pump, which is receivable and retained in the rectangular opening.

6. The pneumatic pressure pulse cleaning machine as claimed in claim 1, wherein the cleaning liquid comprises oil for washing and cleaning automobile parts or machine parts.

7. The pneumatic pressure pulse cleaning machine as claimed in claim 1, wherein the cleaning liquid comprises water for washing and cleaning vegetables/fruits, foods, and agricultural products.

8. The pneumatic pressure pulse cleaning machine as claimed in claim 1, wherein the cleaning liquid comprises dish washing detergent or water for washing and cleaning dishes, bowls, and tableware.

9. A pneumatic pressure pulse cleaning machine, comprising:
- a container body, which has a rear side having an upper portion to which a container cover is rotatably mounted to collectively form a closable container;
- a pipe assembly, which comprises pipes that are connected to and in communication with each other to collectively form a grating configuration, the pipe assembly being received in an interior space of the container body at a location close to a bottom of the container body, the pipe assembly comprising a plurality of through holes formed therein and facing upward, the pipe assembly comprising a joint, which is adapted to connect through a tube to an external pneumatic pressure source to supply pressurized air into the container body; and
- a support board, which is received in the interior space of the container body and comprises legs formed on an underside thereof to be positioned on the bottom of the container body for supporting the support board in an elevated manner with a space formed between the underside of the support board and the bottom of the container body, the support board being located above the pipe assembly with the pipe assembly received in the space under the support board, the support board comprising a plurality of openings formed in an upper surface thereof and extending completely through the support board, a portion of the interior space of the container body that is above the support board forming an article-to-be-washed disposition zone, wherein one or multiple articles-to-be-washed are receivable into the container body to be located in the article-to-be-washed disposition zone and above the support board and a cleaning liquid is filled into the container such that the article-to-be washed is immersed in the cleaning liquid, the container cover being then closed and the pressurized air, which is supplied from the pneumatic pressure source through the pipe assembly and jets out of the plurality of through holes, forms pneumatic pressure pulses in the cleaning liquid, travelling through the openings of the support board and moving through the cleaning liquid to impinge the articles-to-be-washed that is immersed in the cleaning liquid, so that the pneumatic pressure pulses repeatedly flush and wash the articles-to-be-washed immersed in the cleaning liquid to thereby allow a large number of articles to washed and cleaned simultaneously and efficiently;
- wherein the article-to-be-washed is immersed in the cleaning liquid and is cleaned by the cleaning liquid and is further cleansed by being impinged by pressurized gas, which jets from the through holes formed in the pipe assembly that is connected to the external pneumatic source and moves through the cleaning liquid to impinge the article-to-be-washed; and
- wherein the container body is provided with a discharge opening through which the pressurized air jetting into the container body is discharged.

10. The pneumatic pressure pulse cleaning machine as claimed in claim 9, wherein the container body comprises a liquid filling opening that is formed in a side wall of the container body, the liquid filling opening being closable by a closure cap and being openable for filling the cleaning liquid into the container.

11. The pneumatic pressure pulse cleaning machine as claimed in claim 10, wherein the container body has an opposite side wall in which a notch is formed and adapted to receive a tube that is connected to the joint for extension out of the container.

12. The pneumatic pressure pulse cleaning machine as claimed in claim 11, wherein the discharge opening through which the pressurized air jetting into the container is discharged is formed in the opposite side wall.

13. The pneumatic pressure pulse cleaning machine as claimed in claim 9, wherein the container body has a front side to which two buckles are mounted, so that when the container cover is closed, the two buckles are engageable with and thus fix the container cover.

14. The pneumatic pressure pulse cleaning machine as claimed in claim 9, wherein the support board comprises a rectangular opening formed therein, a brush being coupled to a rectangular liquid pump, which is receivable and retained in the rectangular opening.

15. The pneumatic pressure pulse cleaning machine as claimed in claim 9, wherein the cleaning liquid comprises oil for washing and cleaning automobile parts or machine parts.

16. The pneumatic pressure pulse cleaning machine as claimed in claim 9, wherein the cleaning liquid comprises water for washing and cleaning vegetables/fruits, foods, and agricultural products.

17. The pneumatic pressure pulse cleaning machine as claimed in claim 9, wherein the cleaning liquid comprises dish washing detergent or water for washing and cleaning dishes, bowls, and tableware.

* * * * *